United States Patent
Detlef et al.

(10) Patent No.: US 6,243,568 B1
(45) Date of Patent: *Jun. 5, 2001

(54) SYSTEM AND METHOD FOR INTUITIVELY INDICATING SIGNAL QUALITY IN A WIRELESS DIGITAL COMMUNICATIONS NETWORK

(75) Inventors: Michael J. Detlef, Vancouver; Gerald W. Maliszewski, Camas, both of WA (US)

(73) Assignees: Sharp Laboratories of America, Inc., Camas, WA (US); Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/821,997

(22) Filed: Mar. 22, 1997

(51) Int. Cl.$^7$ ............................ H04B 17/00; H04M 11/00
(52) U.S. Cl. .................. 455/226.4; 455/67.1; 455/67.7; 455/421
(58) Field of Search ................... 455/67.1, 67.7, 455/226.1, 226.4, 226.3, 422, 421, 226.2; 348/558, 570, 460

(56) References Cited

U.S. PATENT DOCUMENTS

| | | | |
|---|---|---|---|
| 4,393,499 | * 7/1983 | Evans | 714/704 |
| 4,773,083 | * 9/1988 | Baumbach et al. | 375/328 |
| 4,851,820 | * 7/1989 | Fernandez | 340/825.44 |
| 5,144,296 | * 9/1992 | DeLuca et al. | 340/825.44 |
| 5,157,672 | * 10/1992 | Kondou et al. | 371/43.7 |
| 5,193,216 | * 3/1993 | Davis | 455/67.7 |
| 5,243,428 | * 9/1993 | Challapali et al. | 348/607 |
| 5,313,280 | * 5/1994 | Straus | 348/181 |
| 5,373,548 | * 12/1994 | McCarthy | 455/462 |
| 5,386,495 | * 1/1995 | Wong et al. | 375/224 |
| 5,450,613 | * 9/1995 | Takahara et al. | 455/517 |
| 5,497,383 | * 3/1996 | Thome et al. | 714/795 |
| 5,598,431 | * 1/1997 | Lobel | 375/224 |
| 5,603,088 | * 2/1997 | Gorday et al. | 455/67.3 |
| 5,612,974 | * 3/1997 | Astrachan | 375/295 |
| 5,630,210 | * 5/1997 | Marry et al. | 455/67.3 |
| 5,644,620 | * 7/1997 | Shimura | 455/421 |
| 5,732,347 | * 3/1998 | Bartle et al. | 455/421 |
| 5,737,365 | * 4/1998 | Gilbert et al. | 375/224 |

(List continued on next page.)

FOREIGN PATENT DOCUMENTS

0831414 * 3/1998 (EP) .............................. G06K/7/00

*Primary Examiner*—Nguyen T. Vo
*Assistant Examiner*—Charles N. Appiah
(74) *Attorney, Agent, or Firm*—David C. Ripma; Matthew D. Rabdau; Scott C. Krieger

(57) ABSTRACT

A portable digital communications system is provided that signals the communications recipient of a worsening wireless link with communication partners. In audio communication systems, static is introduced as the alert signal, along with the decoded data that was transmitted. Static gives the communications recipient a qualitative feeling of the wireless link status. In response to the static signal, communications recipients move their positions to improve the link. In a video communications system, static and/or "snow" are introduced as the alert signal to give the recipient a qualitative feeling of the wireless link status. The invention allows the warning signal to be mixed with the decoded data, mixed with simulated data generated to replace incorrectly decoded data, or presented without data. In addition, static is introduced in response to averaging schemes to more closely simulate the performance of static and/or "snow" in an analog receivers. A method for signaling the recipient of a digital communication of a worsening wireless link is also provided.

20 Claims, 6 Drawing Sheets

U.S. PATENT DOCUMENTS

| | | | |
|---|---|---|---|
| 5,752,166 | * | 5/1998 | Dorenbosch et al. .............. 455/67.1 |
| 5,790,596 | * | 8/1998 | Sexton ................................. 375/228 |
| 5,799,242 | * | 8/1998 | Sano ...................................... 455/63 |
| 5,808,671 | * | 9/1998 | Maycock et al. .................... 348/180 |
| 5,809,414 | * | 9/1998 | Coverdale et al. .................. 455/421 |
| 5,815,507 | * | 9/1998 | Vinggaard et al. ................... 371/5.1 |
| 5,819,182 | * | 10/1998 | Gardner et al. ...................... 455/524 |
| 5,896,419 | * | 4/1999 | Suzuki ................................. 375/219 |
| 5,936,979 | * | 8/1999 | Jyrkka ............................... 371/40.11 |
| 5,944,844 | * | 8/1999 | Piirainen et al. .................... 714/704 |

* cited by examiner

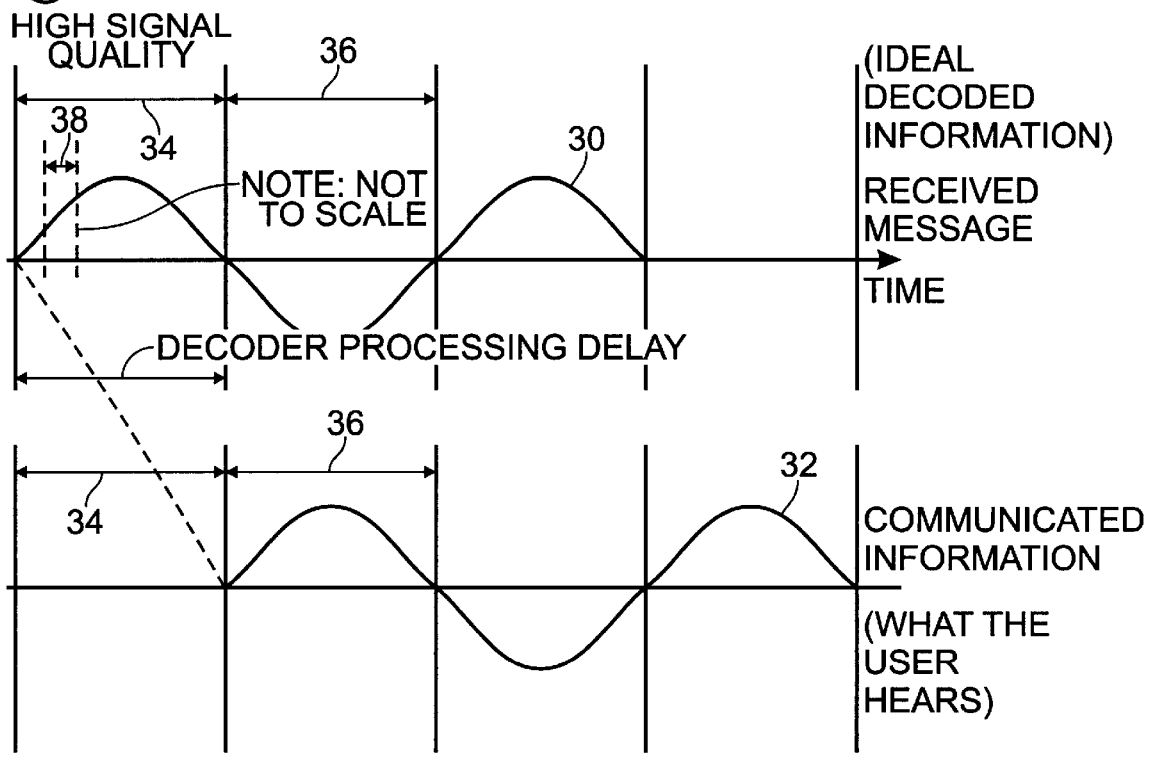
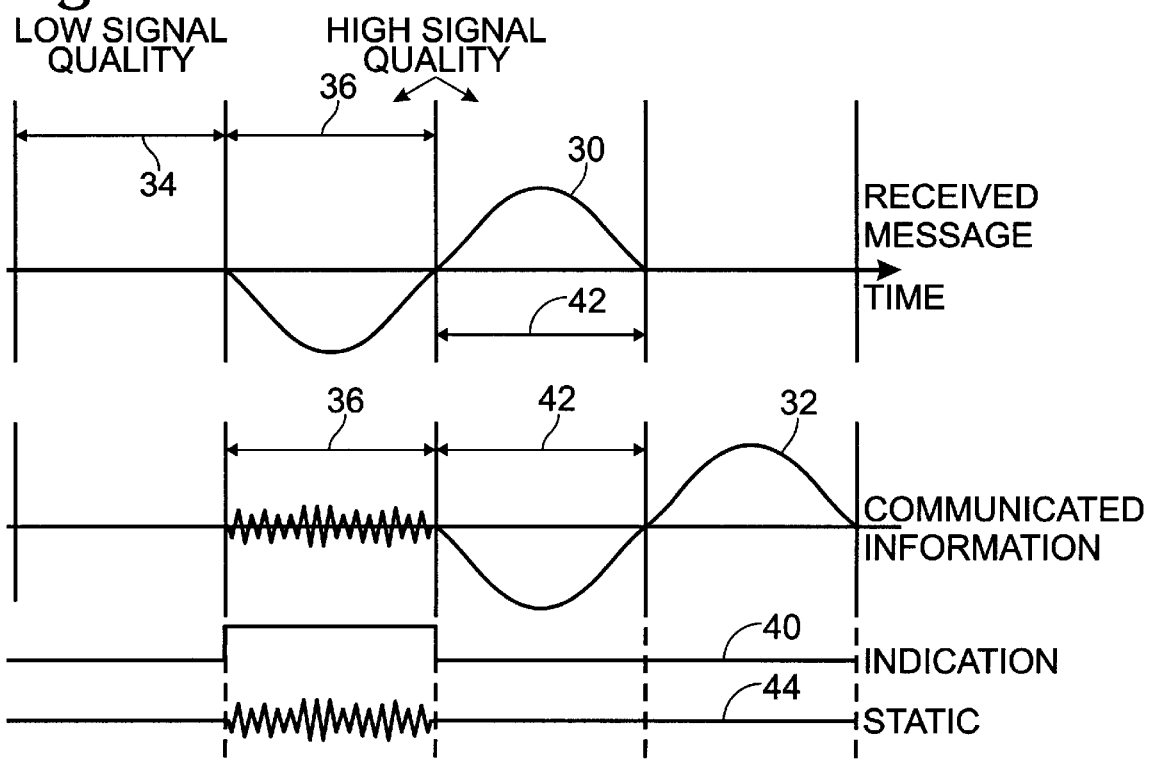

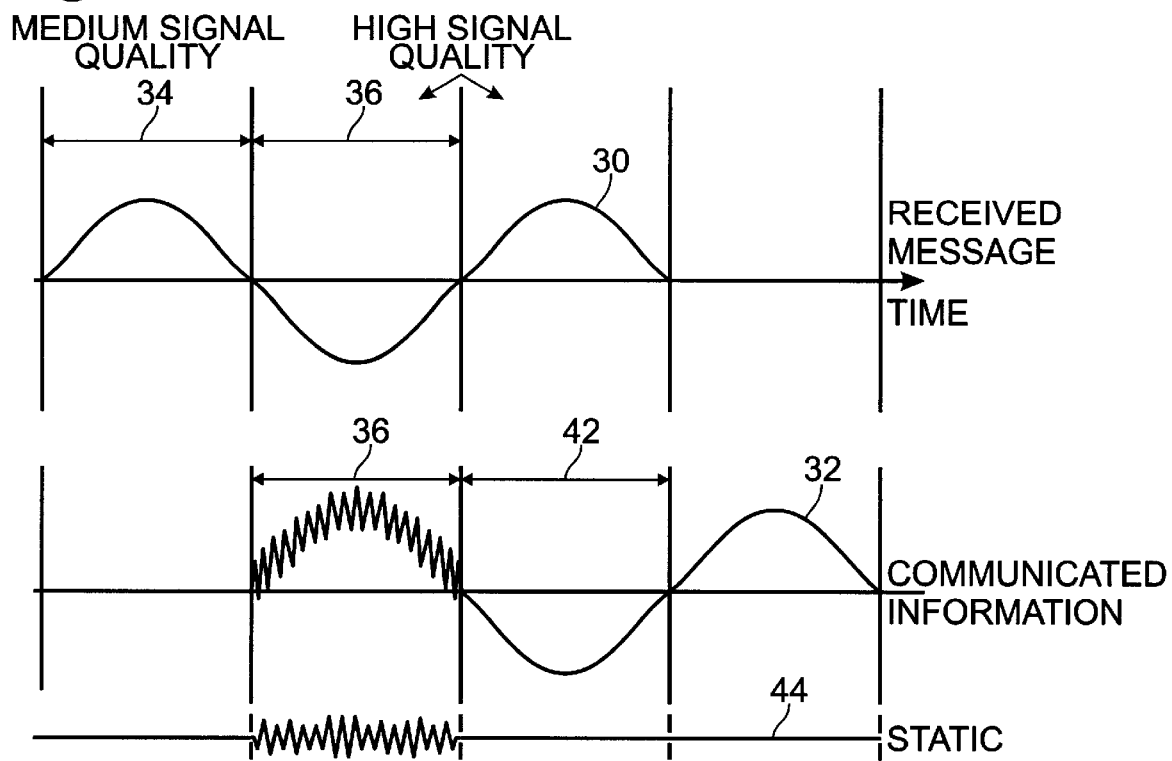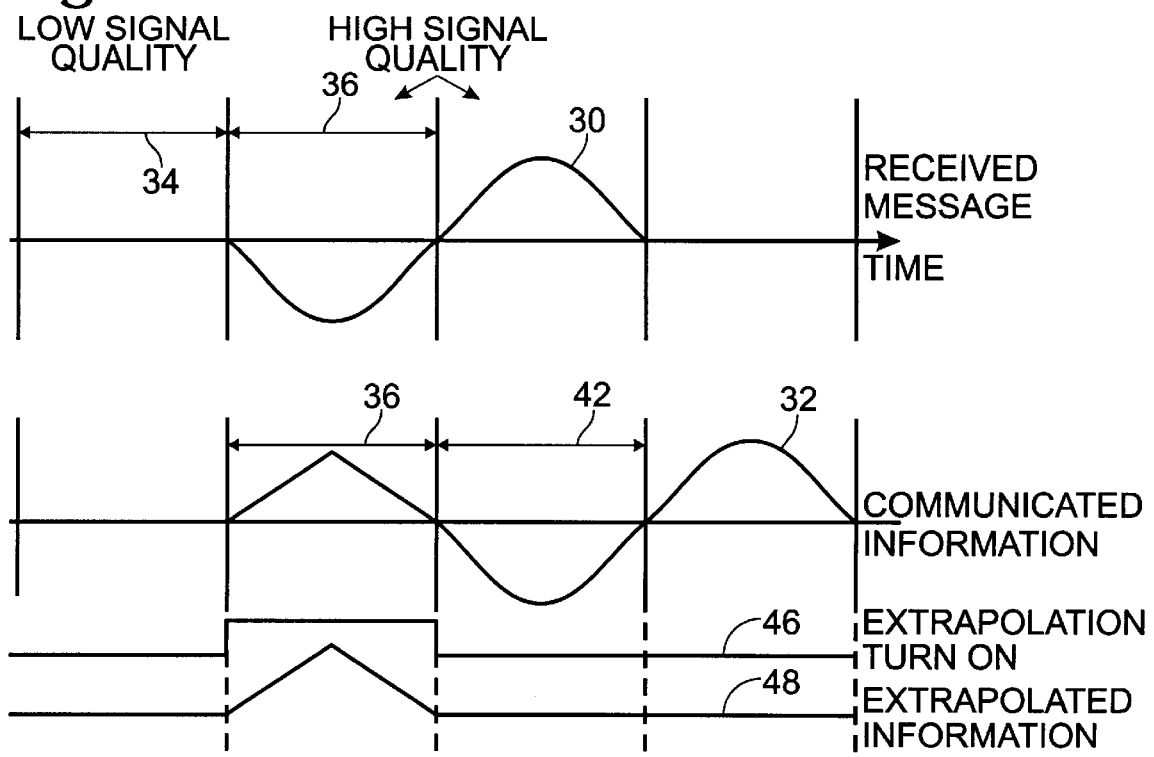

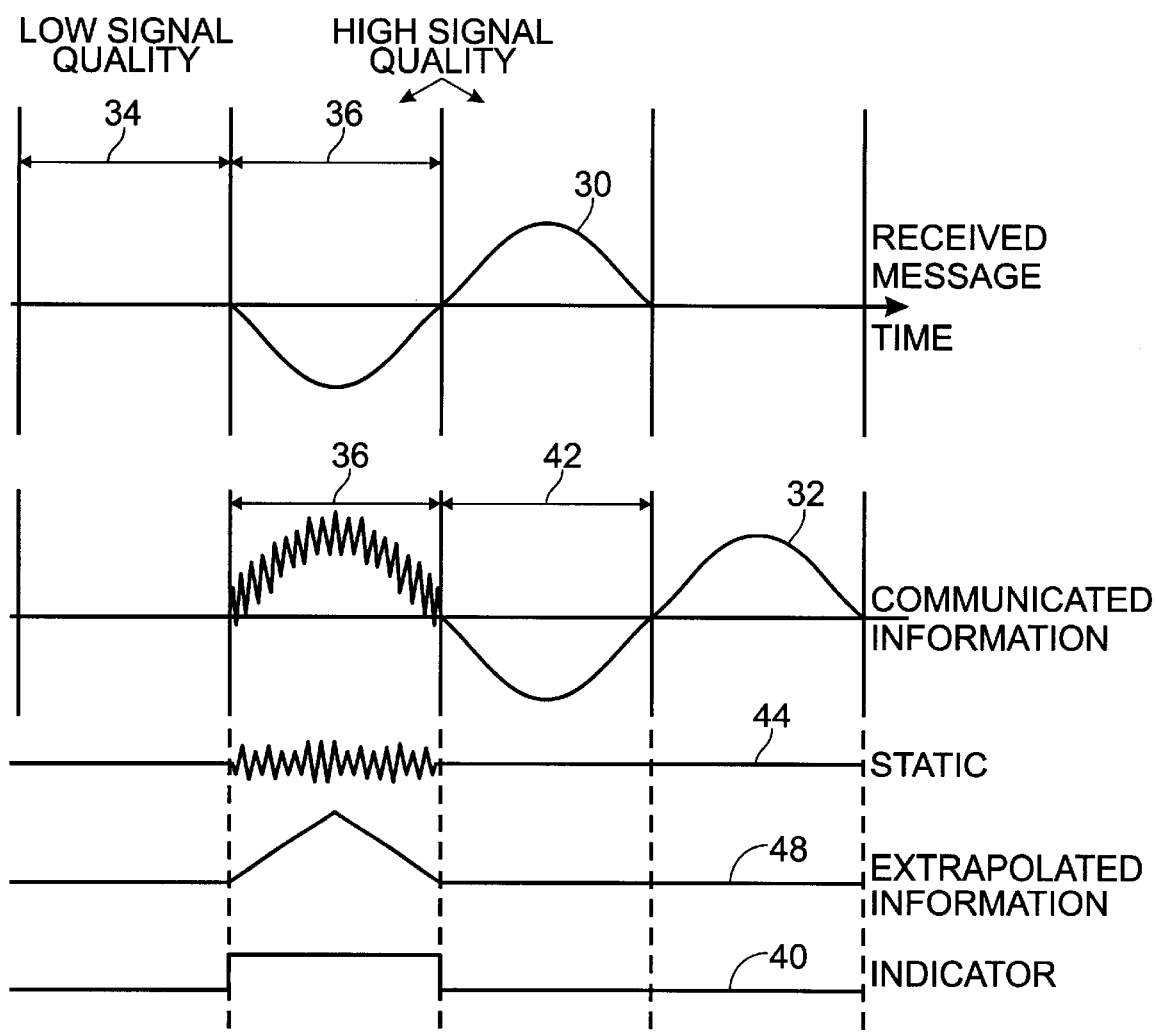

SYSTEM AND METHOD FOR INTUITIVELY INDICATING SIGNAL QUALITY IN A WIRELESS DIGITAL COMMUNICATIONS NETWORK

BACKGROUND AND SUMMARY OF THE INVENTION

The present invention relates generally to wireless communication devices, and more particularly to a system and method for intuitively indicating the signal quality of a wireless communications link.

Most wireless communication devices are mobile stations, such as handheld telephones that are used by pedestrians, or individuals traveling in automobiles. A mobile station can contact another mobile station, or a fixed position relay station, to communicate with other users in the communication system. Typically, a mobile station is free to roam. That is, a mobile station is allowed to operate as it travels through a variety of geographical regions. Often, communication networks are broken up into cells, such as in cellular telephone networks. These cells correspond approximately to geographical regions inside the communication network. As a mobile station, or cellular telephone moves through geographical regions it will change cells, communicating with proximate cells as it moves.

The geographical area in which communications are exchanged with a wireless communications device is typically called a coverage area. The coverage area of a cellular system is limited by a number of parameters. The presence of nearby tall buildings, mountains, or hillsides, shadow (block) radio frequency (RF) signals between a mobile station and a communicating base station. Coverage is also limited by multi-path interference, or the arrival of echoed copies of the same communication at two different periods in time. Operator-configurable system parameters also effect the coverage area. These parameters include the positioning of base station antennas, the selection of which base station communicates with the mobile station, and the transmit power levels of the mobile station and the base station. Co-channel interference between multiple mobile stations and base stations, using the same radio frequency in adjoining cells, also limits the coverage area.

Because of fierce competition between wireless communication providers, and the user's expectation that cellular networks should provide the same level of performance as fixed wireline networks, system operators are active in adjusting system parameters to achieve the optimum performance. In many cases, system parameters are adjusted on a daily basis. Users find that certain so called "dead spots", or locations where communications are frequently dropped or cannot be initiated, remain constant. Other "dead spots" come and go as the side effects of optimizations performed in the network. For example, a cell-site antenna may be re-aimed to provide a stronger signal to one coverage area at the expense of a weaker signal in a second coverage area.

Traditionally, the most qualitative assessment of a fixed line telephone link has been the listener's perception of noise mixed with the intended signal. More recently, analog cellular telephone users have come to rely upon the background static noise as a qualitative assessment of the quality of the communication link. That is, the degree of static that an analog phone user hears tends to be a good indication of whether the call is likely to be dropped, and if the call is dropped, how likely it will be that a new call can be initiated from the same location. The ability to initiate a new call is critical since higher RF signal levels are generally required for initiating a call, as opposed to maintaining an existing call.

Since a majority of the cellular telephones currently in existence are handheld, pedestrian or automobile users play an active role in determining the reliability of their communication link. That is, wireless telephone users often adjust their location to improve the quality of the radio link, thereby reducing the likelihood that the call will be dropped. For this reason, one sees wireless telephone users placing calls near windows or exterior doors where the base station signal is strongest. When calls are dropped, users rely upon their memory of static levels to select the optimum location for initiating a new call.

Presently, second generation cellular telephone systems are being deployed. These systems generally use digital schemes instead of the previously used analog techniques. In addition, digital broadcast television and pager systems are currently in development. Generally, these systems allow operators to support more users with the same limited bandwidth. These digital systems also provide new customer services, resistance to eavesdropping and fraud, and longer battery life. Digital systems also provide a more consistent audio quality. It is believed that in the future, digital systems will replace analog systems.

FIG. 1 illustrates the perceived audio quality of an analog versus digital radio link. In an analog system, the audio quality is highly correlated to the radio link quality. In a digital system, this is not necessarily the case. Digital cellular systems rely upon compression techniques to reduce the transmitted bandwidth requirements. In addition, coded bits are added to the data stream to allow the receiving entity to detect and correct minor errors in the wireless radio communication link. As shown in FIG. 1, when the radio link is good, the received digital cellular speech is perceived as lower in quality than analog speech. This is due to the losses attributable to speech compression. However, as the radio link quality decreases, the ability of the digital system to correct certain errors, results in the maintenance of speech quality at a level which eventually exceeds that of the analog system. At some point, the link becomes so poor that even the digital system's error correction scheme is no longer effective. In practice, such a poor link is shown to be inadequate for maintaining digital, as well as analog communications.

Near "dead spots", a digital telephone may be on the verge of dropping a call, and yet, the user will have little warning that communication is on the verge of interruption. The user of an analog cellular telephone in a similar situation would be warned of a perilous communication link due to the presence of familiar static mixed in with the intended signal. Because the users of digital telephones are unaware of perilous communication links, they are unable to take measures to improve the link. That is, they are unaware that they should change position to improve the communication link. Interspersed muted audio frames are the only sign that some segments of the digital communication have been so poorly received that they are lost. However, in high ambient noise environments, such as typically encountered by a handheld telephone user, it is very difficult to detect these warning signs. In fact, it is only possible to detect these muted frames when the other party is speaking continuously. If the transmitting party is in a quiet setting with no background noise and is not speaking, it is impossible for the digital cellular telephone user to determine if speech frames are being muted.

It would be advantageous if a digital cellular telephone user had a real time indication of the quality of the wireless communications. With such an indicator, telephone users could adjust their location to avoid missing a communication, thereby reducing the chances of having a call dropped.

It would be advantageous if a digital cellular telephone user had an intuitive indicator of the quality of a wireless communications link.

It would also be advantageous if a digital cellular telephone user had a static noise warning to indicate the state of the radio link quality so that they could move positions as analog cellular telephone users do.

It would be advantageous if wireless video receivers had an intuitive, real time, indication of the state of the communication link quality. It would likewise be advantageous if that indicator was a snow-like visual degradation and static sound similar to that of an analog television signal.

Accordingly, in a wireless communication system including a plurality of intercommunicating transceivers to send and receive messages of digitally encoded information, a method of indicating the signal quality of a received message is provided. Alternately, the system includes a plurality of receivers to receive messages of digitally encoded information. The method comprises the steps of: a) estimating the quality of the received message to derive a signal quality estimate and; b) activating an indicator in response to the signal quality estimate in step a), whereby a transceiver user is warned of a poor communications link.

It is an aspect of the invention that the indicator activated in step b) is a static noise sound, whereby the presence of static gives the transceiver user an intuitive sense of the received message signal quality. It is another aspect of the invention to include the further step, following step a), of averaging the estimated signal quality of messages received over a plurality of predetermined first periods of time to create an average signal quality estimate; and activating the indicator in step b) in response to the average signal quality estimate, to present the warning indicator to the user over a predetermined number of predetermined second periods of time. A static noise pattern presented to the user closely simulates the characteristics of an analog receiver.

It is an aspect of the invention that the signal quality estimated in step a) is responsive to the following received message quality data:

1. received message signal strength, which provides a measurement of carrier power of a received message;
2. block decoder status, which indicates whether received messages are successfully decoded into information; and
3. path metric data, which provides a measurement of the corrections required to decode message information. The signal quality is, therefore, based on carrier power, the amount of lost information, and the amount of corrected information.

In one preferred embodiment, the communication system is a GSM cellular phone network with intercommunicating mobile station telephones, in which the signal quality estimated in step a) is also responsive to the following network-controlled message quality data:

4. mobile station transmitter carrier power level, which provides an indication of signal quality as measured by a communicating base station;
5. timing advance, which provides a measurement of how far a mobile station is from a communicating base station; and
6. the status of the discontinuous transmission (DTX) function. The message quality standards are adjusted in response to the increased sensitivity of the transceiver to message errors when DTX mode is in use.

In another preferred embodiment of the invention the communication system is a digital television signal broadcast to digital televisions, and the signal quality estimated in step a) is also responsive to the detection of the loss of sequential broadcast frames. The warning indicator in step b) is a snow-like visual degradation, whereby the user sees an intuitive warning that the received message quality is poor.

A wireless communication system including a plurality of intercommunicating transceivers to send and receive messages of digitally encoded information is also provided. Alternately, the system includes a plurality of receivers to receive messages of digitally encoded information. The system for indicating the signal quality of a received message comprises a signal quality estimator including inputs to accept received message quality data, and an output to provide a signal quality estimate in response to the received quality data. The system also comprises an indicator having an input operatively connected to the output of the signal quality estimator to accept the signal quality estimate, and an output, to warn of poor signal quality, which is activated in response to the signal quality estimate. The indicator warns a user of a poor communications link.

BRIEF DESCRIPTION OF THE DRAWINGS

FIG. 3 illustrates the receipt of a wireless message of digitally encoded information (prior art).

FIG. 4 illustrates a received message during a time period of poor signal quality, and demonstrates the warning indicator feature of the invention.

FIG. 5 illustrates a received message during a time period of moderately poor signal quality, and demonstrates another aspect of the warning feature of the invention.

FIG. 6 illustrates a received message during a time period of poor signal quality, demonstrating the extrapolated information function (prior art).

FIG. 7 illustrates a received message during a time period of poor signal quality, demonstrating the extrapolation and indicator functions of the invention.

DETAILED DESCRIPTION OF THE PREFERRED EMBODIMENTS

Figure 1:
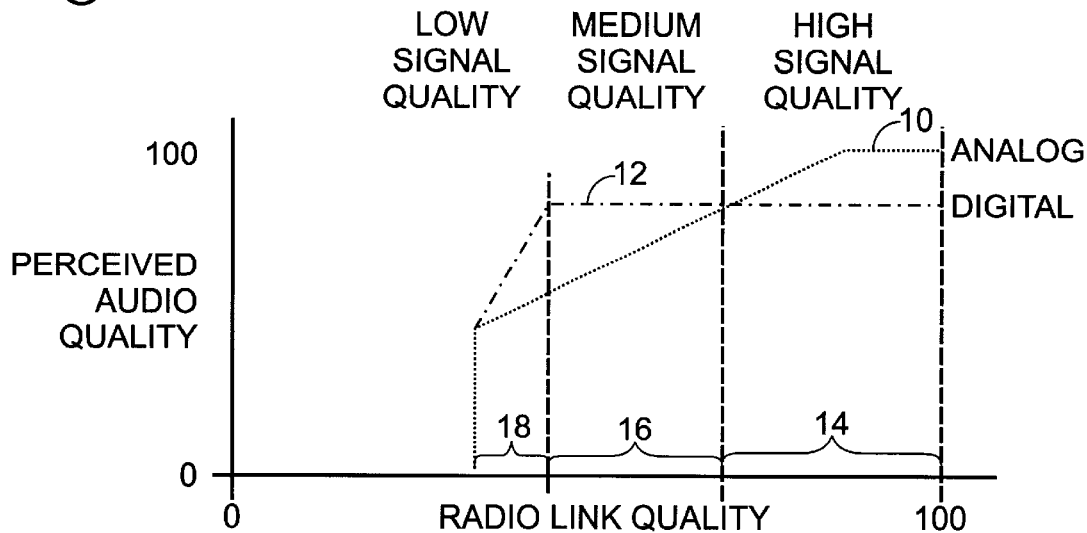
FIG. 1 is a graph illustrating the perceived audio quality of an analog versus digital communication system (prior art).

FIG. 1 is a graph illustrating the perceived audio quality of an analog versus digital communication system (prior art). The radio link quality is represented on a continuum from 0 to 100 percent along the horizontal axis. At 100 percent the radio, or wireless, link is perfect. The vertical axis is perceived audio quality which is also represented along a continuum from 0 to 100 percent. An analog receiver trace 10, and a digital receiver trace 12 are drawn in FIG. 1. When the radio link quality is high, as in the region of radio link quality represented by reference designator 14, the perceived audio quality of an analog receiver is superior to that of a digital receiver. This perceived quality difference is due to compression schemes and error correction formats which reduce the information bandwidth. In the region of radio link quality represented by reference designator 16, the perceived audio quality of the digital receiver is superior to that of the analog. In the region of radio and quality represented by reference designator 18, the perceived audio quality of the digital receiver is still superior to that of the analog receiver, however, the slope between perceived excellent quality and lost communication is very steep. The present invention provides an indication to the user of a digital receiver that they are operating with a radio link quality in the area represented by reference designator 18, or possibly in the area represented by reference designator 16. This warning gives the digital receiver user an opportunity to change location, and thus improve the radio link quality.

Figure 2:
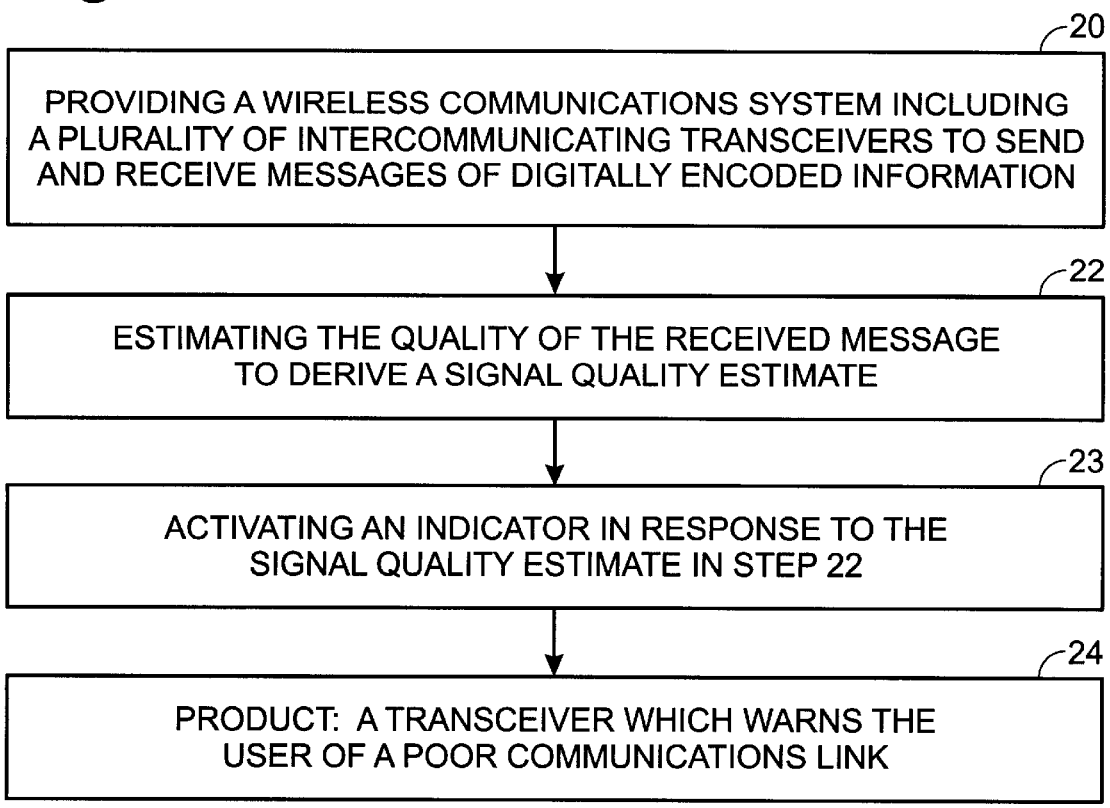
FIG. 2 is a flow diagram illustrating steps in the method of indicating the signal quality of a received message.

FIG. 2 is a flow diagram illustrating steps in the method of indicating the signal quality of a received message. Step 20 provides a wireless communication system including a plurality of intercommunicating transceivers to send and receive messages of digitally encoded information. Alternately, step 20 provides a wireless communication system including a plurality of receivers to receive messages of digitally encoded information. Step 22 estimates the quality of the received message to derive a signal quality estimate. Step 23 activates an indicator in response to the signal quality estimate in Step 22. Step 24 is a product: either a transceiver, or a receiver, which warns the user of a poor communications link.

It is an aspect of the invention that the communications system includes a mobile station, a typical communication system includes a plurality of portable, handheld receivers, or transceivers, having a size and weight small enough to be manipulatable by the user. Because of the mobile station's small size, the user has the option of changing the location of the mobile station in response to an indicator warning that the received message signal is poor.

Various types of indicators are used to warn the user of poor received message quality. In one aspect of the invention, the indicator activated in Step 23 is tactile, the user feels a warning that the received message quality is poor. An example of a tactile indicator is a vibrator, so that the user feels a vibration in the communications equipment as a warning. Alternately, the indicator activated in Step 23 is visual display, whereby the user sees a warning that the received message quality is poor. Typical visual indicators include video, LED, and gauge type displays to give either a qualitative or quantitative reading of signal quality.

In a preferred embodiment of the invention, the indicator activated is an audio signal, whereby the user hears a warning that the received message quality is poor. Since many communications involve audio information, the listener is sensitive to audio signals and, therefore, likely to hear an audio warning. Preferably, the audio indicator activated in Step 23 is a static noise sound, whereby the presence of static gives the user an intuitive sense of the received message signal quality. Since analog communication equipment emits static when the signal is poor, static tends to be an intuitive warning signal.

It is an aspect of the invention that Step 22 includes comparing the signal quality estimate to a predetermined first minimum quality level. Step 23 includes activating the indicator as follows:

1) when the signal quality estimate is greater than, or equal to, the first minimum quality level, the indicator is not activated;
2) when the signal quality estimate is less than the first minimum quality level, the indicator is activated, whereby the user is warned of a message quality below a specified standard.

It is an aspect of the invention that the method includes further steps. Step 25 decodes the received message into information useful to the user, and Step 26 presents the information decoded in Step 25 to the user. In one preferred embodiment, the information decoded in Step 25 is auditory, and the warning indicator in Step 23 is a static noise, whereby communications simulate an analog wireless telephone to give the user an intuitive feeling of signal quality.

A variety of factors regarding a received message are measured and compared to derive a signal quality level. Likewise, the first minimum quality level is a determination built upon a number of factors in the reception of a signal. In the simplest aspect of the invention, the signal quality is calculated from a predetermined scale of values, and compared against a set first quality value. The alarm is triggered as the result of a value comparison. For example, in a simple aspect of the invention the first minimum quality level is the block decoder status, or whether the information in a frame of data bits is decoded. Whenever the block decoder status for a frame is bad, the static warning indicator is turned on. In a more sophisticated aspect of the invention, the values of signal quality are allowed to slide based on situation specifics and a history of recent performance. Likewise, the first minimum quality level is a value that slides based on relative relationships and situation specifics. The simple aspect of the invention is suitable for a hardware implementation, while more sophisticated methods of calculating the signal quality estimate and first minimum level are more easily implemented through software based embodiments of the invention. For example, as in the simple system, static is turned on when the block decoder status is bad. In a more complicated system, the static warning is also turned on, in some situations, when the block decoder status is good, but the path metric (number of corrections made) is high.

FIG. 3 illustrates the receipt of a wireless message of digitally encoded information (prior art). Trace 30 represents the receipt of a wireless message after the carrier signal has been removed. In addition, the signal has already been converted from modulation format, i.e., a digital modulation format, into audio information. For the purposes of clarity, the received signal, or audio information sent by a communicating transmitter, is represented as a sine wave. Actual audio and video signals are significantly more complicated than received message 30, and to the untrained observed appear as random noise. The processed and demodulated received message is presented as communicated information 32. Thus, the signal represented by trace 30 has already been processed several times by the receiver, and has already been subject to some signal quality analysis for the purpose of calculating a signal quality estimate.

Received message 30 is divided into predetermined first periods of time. The block decoder status of received message 30 during time period 34 is good, so the transmitted information is decoded. Likewise, communicating information 32 is divided into predetermined second periods of time. For the purposes of clarity, received message 30 and communicated information 32 are shown as being operated from the same clock. A time delay, or decoder latency, exists between received message 30, received in time period 34, and its presentation to the user as communicated information 32 in time period 36. The delay is due to the process of decoding and correcting the digitally encoded received message 30. For the purposes of clarity, the delay is shown as one time period. In most systems, the time delay between traces 30 and 32 is fixed. Alternately, traces 30 and 32 are asynchronous timed, and the delay between traces is either larger or smaller than one first, or second, time period. That is, received message 30 and communicated information 32 are managed with different clocks so that there is no correlation between the time periods of trace 30 and 32.

In a GSM cellular telephone, time period 34 is typically 20 milliseconds (ms), and 456 bits of digitally coded information are packed into a time period, or frame. A segment of time 38, within time period 34, represents the time allotted for the receipt of a single bit of data.

FIG. 4 illustrates received message 30 during a time period 34 of poor signal quality, and demonstrates the warning feature of the invention. In some aspects of the invention, for example, the block decoder status of received message 30 during frame 34 is bad, and no transmitted information is decoded. Since the information processed by the receiver is not properly decoded, the entire frame of data is withheld. Prior art digital receivers typically operate by presenting no communicated information 32 during time period 36 (i.e., muting the received audio), when no received information 30 is obtained, or decoded, during time period 34.

Referring again to FIG. 2, the signal quality estimate made in Step 22 is less than the first minimum quality level and the indicator is activated. The indicator signal is represented by trace 40 (FIG. 4) and the timing of the signal substantially matches communicated information trace 32. That is, the signal quality estimate made for received message 30 during time period 34, is displayed in time period 36. Once again, indicator signal 40 is shown as operating with the same clock as traces 30 and 32. Alternately, the timing of indicator signal may be different from that of traces 30 and 32. In time period 36, following first period 34, received message 30 is successfully decoded, and the signal quality estimate is greater than the first minimum quality level. Therefore, decoded information is presented as communicated information 32 in time period 42, after the processing delay. Indicator 40 is not activated in time period 42. Indicator signal 40 can be used to turn on a tactical, visual, or audio warning.

FIG. 4 illustrates a static signal 44 superimposed upon the communicated information 32 presented in time period 36, in response to received massage 30 received during time period 34. Static signal 44 is added to communicated information 32 during the entire time period 36. Since no decoded information is presented, the user hears only static during time period 36. Alternately, indicator 40 is triggered just during parts of time period 36 so that static signal 44 is only superimposed during parts of time period 36. Alternately indicator 40 and static 44 are triggered over multiple time periods so that static 44 is superimposed on communicated information over multiple time periods, i.e., periods 36 and 42. In some systems suitable for GSM, an error rate of 15% is likely to cause the lack of information, or bad block decoder status, in received message 30 during time period 34. Alternately, even if received message 30 of time period 34 is successfully decoded, the message may be of poor enough signal quality that a decision is made to overlay static 44, with the decoded information as communicated information 32 during time period 36 to warn the user, see FIG. 5.

Referring again to FIG. 2, it is an aspect of the invention that Step 22 includes comparing the signal quality estimate to a predetermined second minimum quality level. The information decoded in Step 25 is presented to the user in Step 26 as follows:

1) when the signal quality estimate in Step 22 is greater than, or equal to, the second minimum quality level, the decoded information is presented; and 2) when the signal quality estimate in Step 22 is less than the second minimum quality level, the decoded information is not presented, whereby the user is not presented with communicated information when the received message quality is below a specified standard. In some systems suitable for GSM, for example, the second minimum quality level is a 15% error rate.

FIG. 4 illustrates the use of the signal quality estimate with the first and second minimum quality levels. Since the signal quality estimate is less than the first minimum quality level, the static warning is triggered. That is, static is presented as communicated information 32 during time period 36. Since the signal quality estimate is below the second quality estimate, the decoded information is not presented as communicated information 32 during time period 36. In this aspect of the invention the first and second minimum quality levels are substantially equal.

FIG. 5 illustrates received message 30 during a time period 34 of moderately poor signal quality, and demonstrates another aspect of the warning feature of the invention. The signal quality estimate made in Step 22 is greater than a second minimum quality level, so that decoded information is presented as communicated information 32 in time period 36. However, in this aspect of the first and second minimum quality levels are not equal, so that decoded information and static 44 are presented as communicated information 32 during time period 36. In a more sophisticated aspect of the invention, the factors in triggering the static warning and presenting the decoded information are not necessarily the same. The warning and decoding circuits are independent. That is, the two quality determination systems may use different quality inputs, or weight the same quality inputs differently. Also, since the decoding function occurs relatively early in the message receive process, in some aspects of the invention, the decoder circuitry provides outputs that are signal quality inputs for the warning indicator measurement system. Thus, the calculation of whether to present static 44 and decoded information as communicated information 32 are both independent and interrelated. For example, FIG. 4 indicates a situation where the signal quality is low and the quality indicator for both static indicator 44 and decoded information are below their minimum values, i.e., the block decoder status is bad, and the first and second minimum quality levels are defined as a bad block decoder status. In another example, FIG. 5 represents a case where the signal quality is above the second minimum. The decoded information is presented, but since the quality estimate is below the first minimum, static 44 is triggered. For example, in one aspect of the invention the first minimum is a bad block decoder status, and the second minimum is a bad path metric. When received message 30 has a good block decoder status and a bad path metric in time period 34, then both static and the decoded information are presented to the listener as communicated information 32 in time period 36.

Referring to FIG. 2, it is an aspect of the invention that step 22 includes comparing the signal quality estimate to a predetermined third minimum quality level. Step 26 includes presenting extrapolated information and decoded information as follows:

1) when the signal quality estimate is greater than, or equal to, the third minimum quality level in step 22, decoded information is presented; and 2) when the signal quality estimate is less than the third minimum quality level in step 22, extrapolated information is presented, whereby the user is presented with extrapolated information when the message information is not properly received.

FIG. 6 illustrates received message 30 during a time period 34 of poor signal quality, demonstrating the extrapolated information function (prior art). During time period 34, when the signal quality estimate of received message 30 is less than the third minimum quality level, an extrapolated information trace 46 is turned on. The extrapolated information itself is represented by trace 48. Extrapolated information, in some aspects of the invention, is a repetition of the information presented to the user during the previous time segment. Alternately, extrapolated information is a more sophisticated attempt to supply the user with actual data, or at least supply information that the user does not find annoying. Extrapolated information is dependent on amount of time, or decoded bits, since good information has been received. That is, extrapolated information can more accurately mimic decoded information immediately after good decoded information has been received. If decoded information is not received for a long period of time, then extrapolated information is typically just non-annoying information or silence. As with the other signals, the timing of traces 46 and 48 has been shown to be synchronous with traces 30 and 32 for the purposes of clarity. Alternately, traces 46 and 48 are asynchronous with traces 30 and 32.

The information demodulated, or decoded, in response to received message 30 during time period 34 is not presented as communicated information 32 during time period 36. Rather, extrapolated information 48 is presented as communicated information during time period 36. During time period 36, received message 30 is properly recovered. The signal quality estimate is greater than the third minimum quality level, and the decoded information is presented as communicated information 32 during time period 42. FIG. 6 illustrates a situation where the second and third minimum quality levels are substantially equal. Alternately, the second and third quality levels are not equal so that a signal quality estimate between the second and third levels causes no information, either decoded or extrapolated, to appear on communicated information trace 32 during time period 36. In another alternative, the second and third minimum quality levels overlap so that demodulated and extrapolated information are both presented in a mixture on communicated information trace 32 during time period 36.

FIG. 7 illustrates received message 30 during a time period 34 of poor signal quality, demonstrating the extrapolation and indicator functions of the invention. FIG. 7 is a combination of FIGS. 4–6. For the purposes of clarity, the first, second, and third minimum quality levels are approximately equal. During time period 34, the signal quality estimate is below first, second, and third minimum quality levels. Indicator signal 40, static 44, and extrapolated information 48 are generated, so that static 44, is superimposed upon extrapolated information 48, and presented as communicated information during time period 36. Alternately, the first, second, and third minimum quality levels are not equal so that the muting, indicator, and extrapolated information turn on at different times. As mentioned above in the discussion of FIG. 5, in more sophisticated aspects of the invention, the calculation of signal quality is carried out by separate systems for the calculation of first and second minimum quality levels. This same analysis also applies to the calculation of when to present extrapolated information 48, and the definition of the third minimum quality level. Also, the calculation systems are likely to be interrelated. The extrapolation circuitry is likely to be heavily dependent on the decoded information circuitry, since extrapolated information is likely to be based on decoded data from prior periods of time. In other alternatives of the invention, the various signals of FIG. 7 are clocked asynchronously.

Referring to FIG. 2, one aspect of the invention includes the further steps, following Step 22. Step 27 averages the estimated signal quality of messages received over a plurality of predetermined first periods of time to create an average signal quality estimate. Step 28 activates the indicator in Step 23 in response of the average signal quality estimated in Step 27, to present the warning indicator to the user over a predetermined number of predetermined second periods of time. The static noise patterns presented to the user closely simulate the characteristics of an analog receiver.

Figure 8:
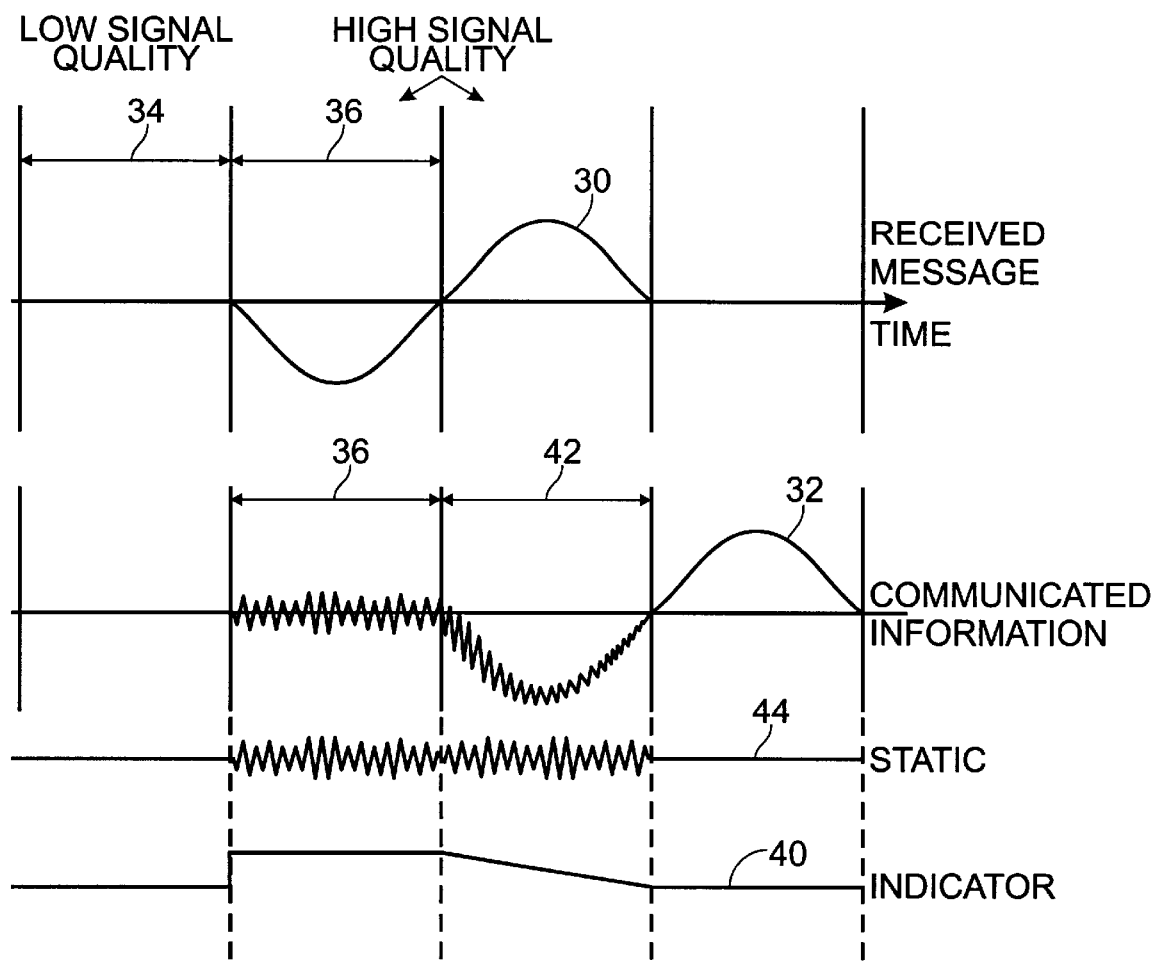
FIG. 8 illustrates a received message during a time period of poor signal quality, demonstrating the indicator averaging function of the present invention.

FIG. 8 illustrates received message 30 during a time period 34 of poor signal quality, demonstrating the indicator averaging function of the present invention. As in FIGS. 3 through 7 above, the quality of the message received during first time period 34 is poor, the block decoder status is bad. In response, warning indicator 40 is triggered during time period 36. However, in addition to being triggered in time period 34, indicator 40 is also triggered in time period 42. Therefore, static 44 is presented to the user as communicated information in time periods 36 and 42. As in FIGS. 3–7, received message 30, and communicated information 32 are arbitrarily shown in a synchronous relationship for the purposes of clarity. The signal quality estimate is averaged over portions of a first time period, a single time period, or over several first time periods. Likewise, depending on the method used to calculate the average, indicator 40 is presented to the user over a portion of a second time period, a single time period, or several second time periods.

Static warning indicator 44, activated above, has a predetermined indicator signal amplitude, a predetermined indicator signal duration, a predetermined indicator signal spectral content, and a predetermined time domain shape, which vary in response to the average signal quality estimate. FIG. 8 illustrates that indicator signal 40 has a ramp shape in time period 42, so that less of static noise 44 is presented in the communicated information in time period 42. A linear relationship between indicator signal 40 and amplitude of static presented as communicated information 32 is shown presented in FIG. 8.

In another alternative aspect of the invention, indicator signal 40 during time period 42 is a pulse having a smaller amplitude than in time period 36. As a result, the static presented as communicated information 32 during time period 42 is of a smaller amplitude than the static presented as communicated information 32 during time period 36. A reduction in static is performed, in some aspects of the invention, to provide a warning, averaged over a plurality time periods, in response to a single frame of received message 30 having a low signal quality. Sometimes this averaging effect gives the digital receiver a more "analog feel", and is more pleasing to the ear of the listener. In other variations the amplitude of the static presented as communicated information 32 is responsive to the quantitative value of signal quality estimate (see FIG. 9), the difference between the signal quality estimate and the first minimum quality level, or the amplitude of indicator 40. For example, when the signal quality of received message 30 is low during time period 34, and medium during time period 36, then the static amplitude of communicated information 32 is high during time period 36, and medium during time period 42.

The length of time that static is presented as communicated information 32 varies in many aspects of the invention. The average signal quality estimate is calculated according to a variety of mathematical algorithms including the averaging of many time periods together, and an average that includes past history of the signal quality estimate mixed together with the instantaneous signal quality. The indicator signal also takes a variety of forms, including simply being off and on, and having amplitudes and shapes to mix the static signal 44, or other indicators, into communicated information 32. In addition, the spectral content of static signal 44 is manipulated in response to average signal quality estimate to, for example, have a frequency content corresponding to different levels of signal quality.

The extrapolation and muting functions are also used with the average signal quality estimate. FIG. 8 illustrates the signal quality estimate being below the second minimum quality level in time period 34 so that no decoded information is presented as communicated information 32 during time period 36. Alternately, decoded information and extrapolated information signal 48 (FIG. 7) are responsive to the average signal quality estimate, so that the amplitude, duration, spectral content, and time domain shape vary as indicator signal 40, described above.

Referring again to FIG. 2, it is an aspect of the invention that the signal quality estimated in Step 22 is responsive to received message quality data such as the received message signal strength, which provides a measurement of carrier power of a received message. The carrier power of a received message must have a threshold above the basic noise level for a message to be received properly. Received carrier power impacts radio link quality as shown in FIG. 1. While the received carrier power may vary greatly before the perceived quality level of digital phone is compromised, a weakening of the received message signal strength may also be used to indicate that the user is about to suffer degraded communications. Indirectly, received signal strength provides an indication of signal quality.

It is an aspect of the invention that the signal quality estimated in Step 22 is responsive to block decoder status, which indicates whether received messages are successfully decoded into information, and path metric data, which provides a measurement of the corrections required to decode message information. The signal quality is based on the amount of lost information, and the amount of corrected information.

Referring to FIG. 3, each received message 30, before demodulation, includes several data bits, for example, data bit 38. Several of the bits are not strictly information, some are code bits added so that the receiver is able to recover corrupted bits in the received message. "Raw" speech is converted into digital information at 64 kilobits per second (kb/sec). To save bandwidth, digital wireless telephones compress the 64 kb/sec data into 13 kb/sec by removing inherent redundancy. Most of the redundant information is restorable by the receiver. Error protection bits are added to the 13 kb/sec of information, resulting in 23.8 kb/sec of "protected" speech being transmitted. The coded bits are use to detect, and then correct, corrupted information bits.

Unfortunately, error protection schemes are not always capable of correcting every incorrectly received bit of data. In one popular digital cellular system, the decoding algorithms begin to loose the ability to correct bit errors when the error rate increases beyond 15 percent. At approximately a 15 percent error ratio, communicated information, mixed with errors, is presented to the listener. Even when the information is discernible, its presentation to the user is often annoying. Generally, the manufacturers of communication equipment make a design decision as to what percentage of error bits will be tolerated before the communicated information is muted. That is, decoded information containing error bits above a predetermined number is not presented to the user in the fear that this communicated information, at least partially, contains corrupted information and errors.

Block decoder status is information generated by a receiver in response to whether each block of coded information received, has been successfully decoded, or whether it has been unsuccessfully decoded due to the presence of too many bit errors. The presence of information blocks having so many errors as to prevent correction, is a strong indicator of poor signal quality.

Path metric data is a finer measurement of received signal quality than the block decoder data. The path metric data measures how many bits of a received message received during a certain period of time actually required correction. For example, as a user begins to receive a message of poor signal quality, the decoded information being presented perfectly to the user will initially be perfect. That is, even when there is a high path metric, or many bit corrections, the block decoder status is initially good. However, a high path metric may be an indication that the user will soon be required to change positions in order to maintain adequate communication.

It is an aspect of the invention that the communication system is a GSM cellular phone network with intercommunicating mobile station telephones. Referring to FIG. 2, the signal quality estimated in Step 22 is also responsive to the following network-controlled message quality data:

mobile station transmitter carrier power level, which provides an indication of signal quality as measured by a communicating base station;

timing advance, which provides a measurement of how far a mobile station is from a communicating base station; and the status of the discontinuous transmission (DTX) function, whereby the message quality standards are adjusted in response to the increased sensitivity of the transceiver to message errors when DTX mode is in use.

In a typical cellular telephone network, the base station determines the carrier power level and timing advance used by the mobile station. A high mobile station transmitter carrier power level indicates that the mobile station is being poorly received at the base station. Likewise, when the base station orders the mobile station to advance the timing of all transmissions to the base station, this is an indication that the mobile station is a far distance from the base station, and that the signal quality, as measured by the base station, is poor.

The DTX function is initiated by the base station in some cellular telephone systems. The DTX function attempts to save mobile station battery power by ordering the mobile station not to transmit when there is no information. That is, when DTX mode is in use, the mobile station does not transmit background noise for periods of time when the user is not speaking. However, the DTX mode makes the loss of transmitted messages more critical, since redundant messages are no longer being sent. Therefore, it is typical to adjust the signal quality to more heavily weight the frame loss count when DTX mode is in use.

In one preferred embodiment of the invention, the communication system is a digital television signal broadcast to digital televisions. The signal quality estimated in Step 22 is responsive to the detection of the loss of sequential broadcast frames, as well as receiver carrier power, block decoder data, and path metric data.

In one aspect of the invention, the information decoded in Step 25 is a video signal having both visual and auditory signal components. The warning indicator in Step 23 is a snow-like visual degradation, such as experienced when the cable, or antenna, signal to an analog television is weak. Thus, the user sees an intuitive warning that the received message quality is poor. In another aspect of the invention the indicator signal in Step 23 is static noise whereby the user hears an intuitive warning that the received message quality is poor. In another aspect of the invention the warning indicator signal in Step 23 is both a static noise and a snow-like visual degradation, whereby the user experiences the familiar characteristics of analog television to warn of poor received message quality. The use of static and snow-like visual degradation in response to poor signal quality is perceived of as more leasing to a user than solid color blocks or screens that continue to hold the last decoded message, which are typically used in the prior art.

Figure 9:
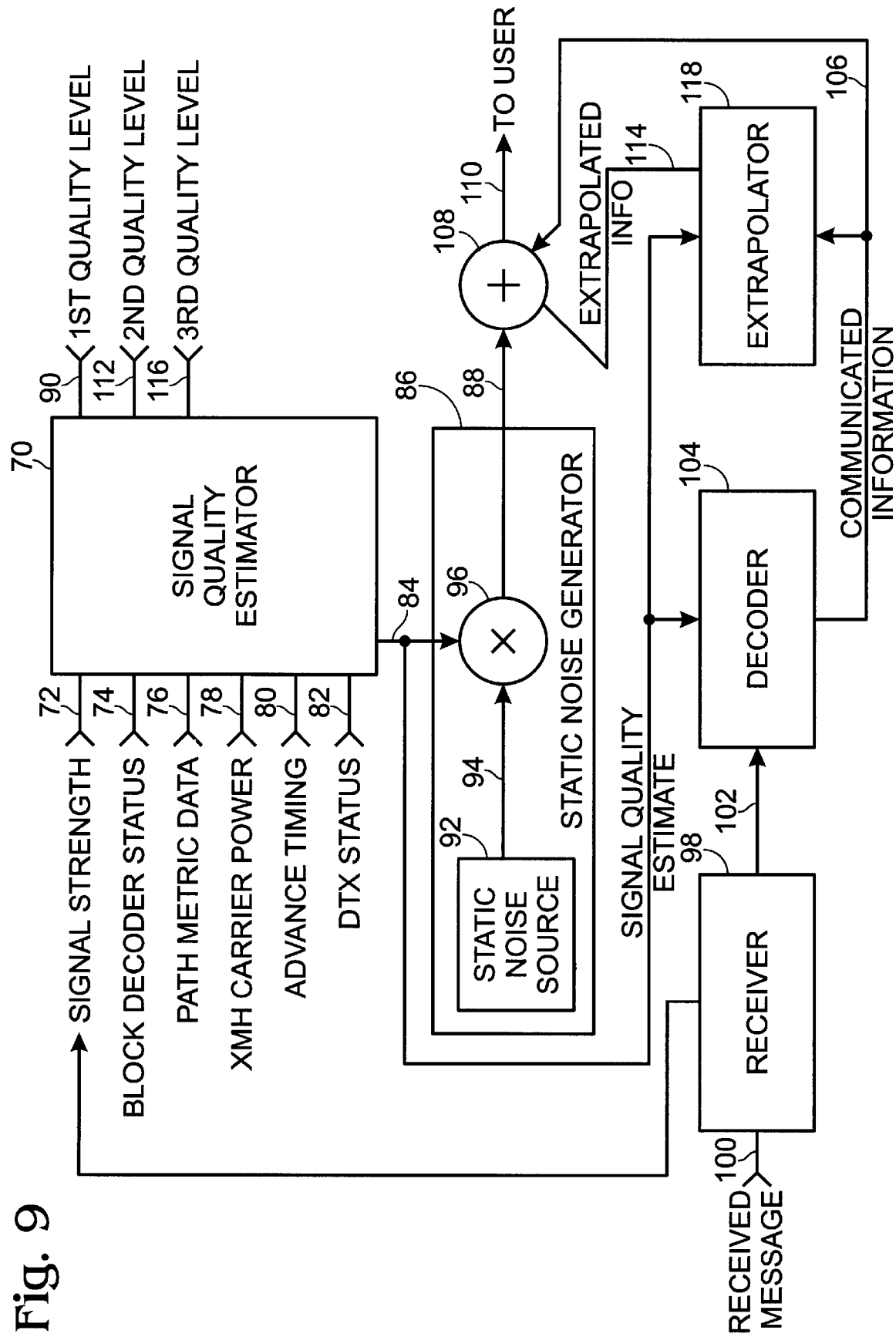
FIG. 9 is a block diagram of the system of the present invention system for indicating the signal quality of a received message.

FIG. 9 is a block diagram of the system of the present invention system for indicating the signal quality of a received message. The system is used in a wireless communication, or telephone, system including a plurality of intercommunicating transceivers, or mobile station telephones, to send or receive messages of digitally encoded information. Alternately, the system indicates the signal quality of a received message used in a wireless communication system including a plurality of receivers to receive message of digitally encoded information. A signal quality estimator 70 includes inputs 72 through 82 to accept received message quality data. Signal quality estimator 70 includes an output 84 to provide a signal quality estimate in response to the received quality data accepted at inputs 72 through 82. The system also includes an indicator 86 having an input operatively connected to output 84 of signal quality estimator 70 to accept the signal quality estimate. Indicator 86 has an output 88, to warn of poor signal quality, which is activated in response to the signal quality estimate on line 84. Indicator 86 warns a transceiver, receiver, or mobile station telephone user of a poor communications link. In one aspect of the invention, the receiver includes separate information decoder, information extrapolation, and indicator warning systems. The systems, even though they are interrelated, independently determine whether they are triggered, and the resulting outputs are mixed and presented to the user. FIG. 9 is a simplified version of such a system.

In one aspect of the invention, the system includes a mobile station, having a size and weight small enough manipulable by the user. The user has the option of changing the location of the mobile station in response to an indicator warning that the received message signal quality is poor.

In one aspect of the invention indicator 86 is a visual display, whereby the user sees a warning that the received message quality is poor. In another aspect of the invention indicator 86 is a tactile device, whereby the user feels a warning that the received message quality is poor. Alternately, indicator 86 is an auditory generator, whereby the user hears a warning that the received message quality is poor.

Signal quality estimator 70 includes an input 90 to accept a predetermined first minimum quality level. Signal quality estimator 70 provides a signal quality estimate on line 84 as follows:

1) when the signal quality estimate is greater than, or equal to, the first minimum quality level on line 90, indicator 86 is provided with a signal that does not activate indicator 86; and
2) when the signal quality estimate is less than the first minimum quality level on line 90, indicator 86 is provided with a signal on line 84 that activates indicator 86. The user is warned of received message quality below a specified standard.

Signal quality estimator 70 includes an input 74 responsive to block decoder status, which indicates whether received messages are successfully decoded into information. Signal quality estimator 70 includes an input 76 responsive to path metric data, which provides a measurement of the corrections required to decode message information. Further, signal quality estimator 70 has an input 72 responsive to receive message signal strength, which provides a measurement of the carrier power of a received message. The signal quality estimate output on line 84 is based on carrier power, the amount of information lost, and the amount of corrected information.

In one preferred embodiment, the communication system is GSM cellular phone network of intercommunicating mobile station telephones. Signal quality estimator 70 includes inputs responsive to the following network-controlled message quality data: mobile station transmission carrier power level on line 78, which provides an indication of the signal quality as measured by a communicating base station; timing advance on line 80, which provides a measurement of how far a mobile station is from the communicating base station; and the status of the discontinuous transmission (DTX) function on line 82, so that the message quality standards are adjusted in response to the increased sensitivity of the transceiver to message errors when DTX mode is in use.

In another preferred embodiment, a communication system is a digital television signal broadcast to digital televisions. Signal quality estimator 70 includes an input, not shown, responsive to the detection of the loss of sequential broadcast frames.

It is an aspect of the invention that signal quality estimator 70 averages the received message quality data input over a plurality of predetermined first periods of time to provide a signal quality estimate average output on line 84 that is an average of the signal quality. Warning indicator 86 is activated during a predetermined number of predetermined second periods of time in response to the signal quality estimate average. Indicator 86 is activated in response to a pattern of received message quality.

It is an aspect of the invention that warning indicator 86 is a static noise generator having an input operatively connected to signal quality estimator output 84 to accept the signal quality estimate, and an output 88 to provide a static warning. The user, hearing the static, has an intuitive sense of the received message quality. Static generator 86 includes a static noise source 92 having an output 94 to provide static noise. Static generator 86 includes a mixer circuit 96 to control the amplitude of static warning output 88. Mixer 96 has two inputs and an output, a first input operatively connected to signal quality estimator output 84 to accept the signal quality estimate, and a second input operatively connected to static noise source output 94 to accept static noise. Mixer 96 controls the amplitude of the static noise in response to the signal quality estimate to generate static warning output on line 88, whereby the user hears louder static when the received message is of poorer quality.

In one preferred embodiment of the invention, the encoded information transmitted by the communicating partner is audio, whereby a digital radio telephone user has an intuitive warning of signal quality that is similar to that of an analog wireless phone. That is, the user of an audio communications product is accustomed to hear static as an indicator of link quality.

It is an aspect of the invention that the system further comprises a receiver 98 having an input 100 to accept received wireless messages, and an output 102 to provide digitally encoded messages. The system also comprises a decoder circuit 104 to decode digital information, having an input operatively connected to receiver output 102 to accept a digitally encoded message, and an output 106 to provide decoded information. The system further comprises an adder circuit 108 to combine the decoded information on line 106 with the static warning on line 88. Adder circuit 108 has a first input operatively connected to static noise generator output 88 to accept the static warning, a second input operatively connected to decoder circuit output 106 to accept decoded information, and an output 110 to provide communicated information to the user as a combination of decoded information with an indication of signal quality. The combination of static with decoded information gives the user an intuitive sense of the received message quality.

It is an aspect of the invention that signal quality estimator 70 includes an input 112 to accept a predetermined second minimum quality level. As noted above, decoder circuit 104 has an input operatively connected to signal quality estimator output 84. Decoder circuit 104 is responsive to the signal quality estimate on line 84 to provide decoded information as follows:

1) when the signal quality estimate on line 84 is greater than, or equal to, the second minimum quality level on line 112, decoded information is provided on line 106 to adder circuit 108; and 2) when the signal quality estimate on line 84 is less than the second minimum quality level on line 112, no decoded information is provided on line 106 to adder circuit 108. The user is not presented with decoded information when a received message quality below a specified standard.

It is an aspect of the invention that adder circuit 108 includes an input 114 to accept extrapolated information. Signal quality estimator 70 includes an input 116 to accept a predetermined third minimum quality level. The system further comprises an extrapolator circuit 118 having an input operatively connected to signal quality estimator output 84 to accept the signal quality estimate, and an input operatively connected to decoder output 106 to accept decoded information.

Extrapolator circuit 118 has an output operatively connected to adder circuit input 114 to provide extrapolated information. Extrapolator 118 is responsive to the signal quality estimate on line 84 as follows:

1) when the signal quality estimate on line 84 is greater than, or equal to, the third minimum quality level on line 116, no extrapolated information is provided to adder circuit 108; and 2) when the signal quality estimate on line 84 is less than the third minimum quality level on line 116, extrapolated information is provided to adder circuit 108. The user is presented with extrapolated information in response to the received message quality.

In one preferred embodiment of the invention the encoded information is video, having visual and audio signal components, and warning indicator output 88 is static noise, whereby the user has an intuitive warning of signal quality to help adjust reception of the message. In another aspect of the invention, warning indicator output 88 is snow-like visual distortion, whereby a user has an intuitive warning of signal quality to help adjust reception of the message. In another aspect of the invention the warning indicator output 88 is both static noise and snowSMT like visual distortion, whereby the user has an intuitive warning of signal quality similar to that of an analog television.

Alternately, signal quality estimator 70 may provide three different signal quality estimates (not shown) to static noise generator 86, decoder 104, and extrapolator circuit 118. These three signal quality estimates are responsive, respectively, to first quality level on 90, second quality level on line 112, and third quality level on line 116. Thus, the triggering of indicator 86, muting of the decoder 104, and triggering of extrapolator 118 are performed at different estimates of signal quality. As another alternative, two minimum quality levels are equal, the second and third levels for example. Then, the warning indicator is activated when the signal quality is below the first minimum quality level, and when the signal quality level is below the second (third) quality level, extrapolated information is presented instead of decoded information. When the first, second and third quality levels are the same, the same signal quality estimate 84 is provided to indicator 86, decoder 104, and extrapolator 118.

FIG. 9 depicts the invention configured with electrical and mechanical elements. Alternately, many of the functions shown in FIG. 9, and mentioned above, are enabled through the use of software routines. Software routines perform comparison, averaging, extrapolation, mixing, adding, and calculation, and are well known in the art.

New types of communication systems are currently in development, and the ones presently in existence are being improved to incorporate the performance enhancement features of digital systems. In addition, the price and size of the units in many of these communication systems allow them to be portable, handheld, and even pocket size. While the presence of static in a telephone signal, or snow in a television picture, is typically experienced as an annoyance by the user, they also provide the user with a non-quantitative measurement of signal quality. The more static a received message has, the poorer the signal quality. A user motivated to receive a high quality signal knows enough to change location in response to the presence of static. Because of the superior performance of digital systems in environments where a wireless link, or radio frequency, message is poor, users are not aware that they may be perilously close to loosing a message. The system and method of the present invention gives the user of the digital communication products a warning of poor wireless message quality. The use of static provides the user with an intuitive sense of measurement quality that people have inherently learned from decades of using analog communication products.

Although a preferred embodiment of the invention is applicable to digital cellular phones, the invention is also applicable to digital paging systems, and digital television broadcast systems. Other modifications and variations within the scope of the present invention will occur to those skilled in the art.

What is claimed is:

1. In a digital wireless communications system including a plurality of intercommunicating transceivers to send and receive messages of digitally encoded information, a method for a receiver to indicate the signal quality of a received message to the user of the receiver comprising the steps of:

a) decoding the received digital message;

b) following step a), estimating the quality of the received message to derive a signal quality estimate;

c) activating a static warning indicator in response to the signal quality estimate in step b), whereby a transceiver user is warned of a poor communications link;

d) presenting the information decoded in step a) to the user;

e) averaging the estimated signal quality of messages received over a plurality of predetermined first periods of time to create an average signal quality estimate; and f) activating the indicator in step c) in response to the average signal quality estimated in step e), the static warning indicator activated having a predetermined indicator signal amplitude, a predetermined indicator signal duration, a predetermined indicator signal spectral content, and a predetermined time domain shape, which vary in response to the average signal quality estimated in step e), to present the warning indicator to the user over a predetermined number of predetermined second periods of time, whereby the static noise patterns presented to the user closely simulate the characteristics of an analog receiver.

2. In a digital wireless communications system including a plurality of intercommunicating transceivers to send and receive messages of digitally encoded information, the communications system being a GSM cellular phone network with intercommunicating mobile station telephones and a communicating base station, wherein the system utilizes a discontinuous transmission function (DTX) to disable transmission during periods of time when no information is being transmitted, and wherein the base station initiates the DTX function, a method for a receiver to indicate the signal quality of a received message to the user of the receiver comprising the steps of:

a) decoding the received digital message to recover the encoded information;

b) following step a), estimating the quality of the received information to derive a signal quality estimate, the signal quality being estimated in response to the following network-controlled message quality data:

1) received message signal strength, which provides a measurement of carrier power of a received message;

2) block decoder status, which indicates whether received messages are successfully decoded into information;

3) path metric data, which provides a measurement of the corrections required to decode message information, whereby the signal quality is based on carrier power, the amount of lost information, and the amount of corrected information;

4) mobile station transmitter carrier power level, which provides an indication of signal quality as measured by a communicating base station;

5) timing advance, which provides a measurement of how far a mobile station is from a communicating base station; and 6) the status of the DTX function to determine if the DTX function has been initiated, whereby the message quality standards are adjusted in response to the increased sensitivity of the transceiver to message errors when DTX mode is in use;

c) activating an indicator in response to the signal quality estimate in step b), whereby a transceiver user is warned of a poor communications link; and d) presenting the information decoded in step a) to the user.

3. In a digital wireless communications system including a plurality of intercommunicating transceivers to send and receive messages of digitally encoded information, wherein the communications system is a GSM cellular phone network of intercommunicating mobile station telephones and a communicating base station, wherein the system utilizes a discontinuous transmission function (DTX) to disable transmission during periods of time when no information is being transmitted, wherein the base station initiates the DTX function, a system for a receiver to indicate the signal quality of received information to a user of the receiver comprising:

a decoder circuit to decode digital information, having an input operatively connected to said receiver output to accept a digitally encoded message, and an output to provide decoded information;

a signal quality estimator including inputs to accept received message quality data which is responsive to errors in decoding the information, and inputs responsive to the following network-controlled message quality data:

received message signal strength, which provides a measurement of the carrier power of a received message;

block decoder status, which indicates whether received messages are successfully decoded into information;

path metric data which provides a measurement of the corrections required to decode message information, whereby the signal quality estimate output is based on carrier power, the amount of lost information, and the amount of corrected information;

mobile station transmission carrier power level, which provides an indication of signal quality as measured by a communicating base station;

timing advance, which provides a measurement of how far a mobile station is from a communicating base station; and the status of the DTX function to determine in the DTX function has been initiated, so that the message quality standards are adjusted in response to the increased sensitivity of the transceiver to message errors when DTX mode is in use;

said signal quality estimator further including an output to provide a signal quality estimate in response to the received quality and the network-controlled message quality data; and an indicator having an input operatively connected to the output of said signal quality estimator to accept the signal quality estimate, and an output, to warn of poor signal quality, which is activated in response to the signal quality estimate, whereby said indicator warns a transceiver user of a poor communications link.

4. In a wireless communications system including a plurality of intercommunicating transceivers to send and receive messages of digitally encoded information, a system for indicating the signal quality of a received message comprising:

a signal quality estimator including inputs to accept received message quality data, including an input to accept a predetermined second minimum quality level, and an output to provide a signal quality estimate in response to the received quality data;

a warning indicator which is a static noise generator that generates a static warning that warns a transceiver user of a poor communications link, said warning indicator having an input operatively connected to the output of said signal quality estimator to accept the signal quality estimate, and an output, to warn of poor signal quality, said static warning being activated in response to the signal quality estimate;

a receiver having an input to accept wireless messages, and an output to provide digitally encoded messages;

a decoder circuit to decode digital information, having an input operatively connected to said receiver output to accept a digitally encoded message and an input operatively connected to said signal quality estimator output, and an output to provide decoded information; and an adder circuit to combine the decoded information, with the static warning, said adder circuit having a first input operatively connected to said static noise generator output to accept the static warning, and a second input operatively connected to said decoder circuit output to accept decoded information, said decoder circuit being responsive to the signal quality estimate to provide decoded information as follows:

1) when the signal quality estimate is greater than, or equal to, the second minimum quality level, decoded information is provided to said adder circuit; and
2) when the signal quality estimate is less than the second minimum quality level, no decoded information is provided to said adder circuit, whereby the user is not presented with decoded information when the received message quality is below a specified standard;

said adder circuit including an output to provide a combination of the decoded information provided by the decoder circuit with the static warning to provide an indication of signal quality, whereby the combination of static with decoded information gives the user an intuitive sense of the received message quality.

5. A system as in claim 4 in which said adder circuit includes an input to accept extrapolated information, in which said signal quality estimator includes an input to accept a predetermined third minimum quality level, and in which the system further comprises:

an extrapolator circuit having an input operatively connected to said signal quality estimator output to accept the signal quality estimate, and an output operatively connected to said adder circuit input to provide extrapolated information, said extrapolator responsive to the signal quality estimate as follows:

1) when the signal quality estimate is greater than, or equal to, the third minimum quality level, no extrapolated information is provided to said adder circuit; and
2) when the signal quality estimate is less than the third minimum quality level, extrapolated information is provided to said adder circuit, whereby the user is presented with extrapolated information in response to the received message quality.

6. A system as in claim 5 in which said signal quality estimator includes an input to accept a predetermined first minimum quality level, and in which said signal quality estimator provides a signal quality estimate output as follows:

1) when the signal quality estimate is greater than, or equal to, the first minimum quality level, said indicator is provided with a signal that does not activate said indicator; and
2) when the signal quality estimate is less than the first minimum quality level, said indicator is provided with a signal that activates said indicator, whereby the user is presented with an indicator warning, with decoded information, and with extrapolated information in response to the received message quality level.

7. In a digital wireless telephone system including a plurality of intercommunicating mobile station telephones to send and receive messages of digitally encoded information, wherein the system utilizes a discontinuous transmission function (DTX) to disable transmission during periods of time when no information is being transmitted, and a communicating base station which initiates the function, a system for indicating the signal quality of a received message comprising:

a signal quality estimator including inputs to accept received message quality data, and an output to provide a signal quality estimate in response the received quality data, said signal quality estimator having inputs responsive to the following message quality data:

received message signal strength, which provides a measurement of carrier power of a received message;
block decoder status, which indicates whether received messages are successfully decoded into information;
path metric data, which provides a measurement of corrections required to decode message information,
mobile station transmission carrier power level, which provides an indication of signal quality as measured by a communicating base station;
timing advance, which provides a measurement of how far and a mobile station is from a communicating base station; and
the status of the DTX function to determine if the DTX function has been initiated, so that the message quality standards are adjusted in response to the increased sensitivity of the transceiver to message errors when DTX mode is in use;

a static noise generator having an input operatively connected to said signal quality estimator output to accept the signal quality estimate, and an output to provide a static warning, whereby the transceiver user, hearing the static, has an intuitive sense of the received message quality;

a receiver having an input to accept wireless messages, and an output to provide digitally encoded messages;

a decoder circuit to decode digital information, having an input operatively connected to said receiver output to accepted digitally encoded information, and an output to provide decoded information; and an adder circuit to combine decoded information with the static warning, said adder circuit having a first input operatively connected to said static noise generator output to accept the static warning, a second input operatively connected to said decoder circuit output to accept decoded information, and an output to provide a combination of decoded information with an indication of message quality, whereby combining the static with a audio information gives the telephone user an intuitive sense of the received message quality.

8. In a digital wireless telephone system including a plurality of intercommunicating mobile station telephones to send and receive messages of digitally encoded information, wherein the system utilizes a discontinuous transmission function (DTX) to disable transmission during periods of time when no information is being transmitted, and a communicating base station which initiates the DTX function, a system for indicating the signal quality of a received message comprising:

a signal quality estimator including inputs to accept received message quality data, and an output to provide a signal quality estimate in response the received quality data, said signal quality estimator having inputs responsive to the following message quality data:

received message signal strength, which provides a measurement of carrier power of a received message;
block decoder status, which indicates whether received messages are successfully decoded into information;
path metric data, which provides a measurement of corrections required to decode message information,
mobile station transmission carrier power level, which provides an indication of signal quality as measured by a communicating base station;
timing advance, which provides a measurement of how far and a mobile station is from a communicating base station; and the status of the DTX function to determine if the DTX function has been initiated, so that the message quality standards are adjusted in response to the increased sensitivity of the transceiver to message errors when DTX mode is in use said signal quality estimator averaging the received message quality data inputs over a plurality of predetermined first periods of time to provide a signal quality estimate average output that is an average of the signal quality;

a static noise generator having an input operatively connected to said signal quality estimator output to accept the signal quality estimate, and an output to provide a static warning, said static noise generator being activated during a predetermined number of predetermined second periods of time in response to the signal quality estimate average, whereby the telephone user hears a static pattern of an analog telephone in response to a pattern of received message quality:

a receiver having an input to accept wireless messages, and an output to provide digitally encoded messages;

a decoder circuit to decode digital information, having an input operatively connected to said receiver output to accepted digitally encoded information, and an output to provide decoded information; and an adder circuit to combine decoded information with the static warning, said adder circuit having a first input operatively connected to said static noise generator output to accept the static warning, a second input operatively connected to said decoder circuit output to accept decoded information, and an output to provide a combination of decoded information with an indication of message quality, whereby combining the static with a audio information gives the telephone user an intuitive sense of the received message quality.

9. In a wireless communications system including a plurality of receivers to receive messages of digitally encoded information, a method of indicating the signal quality of a received message comprising the steps of:

a) estimating the quality of the received message to derive a signal quality estimate;

b) activating an indicator in response to the signal quality estimate in step a);

c) decoding the received message into information useful to the user;

d) presenting information decoded in step c) to the user;

e) averaging the estimated signal quality of messages received over a plurality of predetermined first periods of time to create an average signal quality estimate;

f) activating the indicator in step b) in response to the average signal quality estimated in step e), to present a warning to the user over a predetermined number of predetermined second periods of time, whereby the activated indicator closely simulates the characteristics of an analog receiver; and in which the warning indicator activated in step f) has a predetermined indicator signal amplitude, a predetermined indicator signal duration, a predetermined indicator signal spectral content, and a predetermined time domain shape, which vary in response to the average signal quality estimated in step e).

10. In a GSM cellular phone network communications system with intercommunicating mobile station telephones and a communicating base station, wherein the system utilizes a discontinuous transmission function (DTX) to disable transmission during periods of time when no information is being transmitted, wherein the base station initiates the function, a method of indicating the signal quality of a received message comprising the steps of:

a) estimating the quality of the received message to derive a signal quality estimate in response to the following received message quality data:
 1) received message signal strength, which provides a measurement of carrier power of a received message;
 2) block decoder status, which indicates whether received messages are successfully decoded into information; and
 3) path metric data, which provides a measurement of the corrections required to decode message information, whereby the signal quality is based on carrier power, the amount of lost information, and the amount of corrected information;

in which the signal quality estimated in step a) is also responsive to the following network-controlled message quality data;
 4) mobile station transmitter carrier power level, which provides an indication of signal quality as measured by a communicating base station;
 5) timing advance, which provides a measurement of how far a mobile station is from a communicating base station; and
 6) the status of the DTX function to determine if the DTX function has been initiated, whereby the message quality standards are adjusted in response to the increased sensitivity of the transceiver to message errors when DTX mode is in use;

b) activating an indicator in response to the signal quality estimate in step a);

c) decoding the received message into information useful to the user; and d) presenting information decoded in step c) to the user.

11. In a GSM cellular phone network of intercommunicating mobile station telephones and a communicating base station, wherein the network utilizes a discontinuous transmission function (DTX) to disable transmission during periods of time when no information is being transmitted, wherein the base station initiates the function, a system for indicating the signal quality of a received message comprising:

a signal quality estimator including an input to accept received message quality data, an output to provide a signal quality estimate in response to received quality data;

in which said signal quality estimator has inputs responsive to the following received message quality data:
 received message signal strength, which provides a measurement of the carrier power of a received message;
 block decoder status, which indicates whether received messages are successfully decoded into information; and
 path metric data which provides a measurement of the corrections required to decode message information, whereby the signal quality estimate output is based on carrier power, the amount of lost information, and the amount of corrected information;

in which said signal quality estimator includes inputs responsive to the following network-controlled message quality data:
 mobile station transmission carrier power level, which provides an indication of signal quality as measured by a communicating base station;

timing advance, which provides a measurement of how far a mobile station is from a communicating base station; and the status of the DTX function to determine if the DTX function has been initiated, so that the message quality standards are adjusted in response to the increased sensitivity of the transceiver to message errors when DTX mode is in use; and an indicator having an input operatively connected to the output of said signal quality estimator to accept the signal quality estimate, and an output, to warn of poor signal quality, which is activated in response to the signal quality estimate, whereby said indicator warns a receiver user of a poor communications link.

12. In a wireless communications system including a plurality of intercommunicating transceivers to send and receive messages of digitally encoded information, a system for indicating the signal quality of a received message comprising:

a signal quality estimator including inputs to accept received message quality data, and an output to provide a signal quality estimate in response to the received quality data;

an indicator which is a static noise generator having an input operatively connected to said signal quality estimator output to accept the signal quality estimate, and an output to provide a static warning, whereby the user, hearing the static, has an intuitive sense of the received message quality;

a receiver having an input to accept wireless messages, and an output to provide digitally encoded messages;

a decoder circuit to decode digital information, having an input operatively connected to said receiver output to accept a digitally encoded message, and an output to provide decoded information;

an adder circuit to combine the decoded information with the static warning, said adder circuit having a first input operatively connected to said static noise generator output to accept the static warning, a second input operatively connected to said decoder circuit output to accept decoded information, and an output to provide a combination of decoded information with an indication of signal quality, whereby the combination of static with decoded information gives the user an intuitive sense of the received message quality; and in which said signal quality estimator includes an input to accept a predetermined second minimum quality level, and in which said decoder circuit has an input operatively connected to said signal quality estimator output, said decoder circuit responsive to the signal quality estimate to provide decoded information as follows:
1) when the signal quality estimate is greater than, or equal to, the second minimum quality level, decoded information is provided to said adder circuit; and
2) when the signal quality estimate is less than the second minimum quality level, no decoded information is provided to said adder circuit, whereby the user is not presented with decoded information when the received message quality is below a specified standard.

13. A system as in claim 12 in which said adder circuit includes an input to accept extrapolated information, in which said signal quality estimator includes an input to accept a predetermined third minimum quality level, and in which the system further comprises:

an extrapolator circuit having an input operatively connected to said signal quality estimator output to accept the signal quality estimate, and an output operatively connected to said adder circuit input to provide extrapolated information, said extrapolator responsive to the signal quality estimate as follows:
1) when the signal quality estimate is greater than, or equal to, the third minimum quality level, no extrapolated information is provided to said adder circuit; and
2) when the signal quality estimate is less than the third minimum quality level, extrapolated information is provided to said adder circuit, whereby the user is presented with extrapolated information in response to the received message quality.

14. A system as in claim 13 in which said signal quality estimator includes an input to accept a predetermined first minimum quality level, and in which said signal quality estimator provides a signal quality estimate output as follows:
1) when the signal quality estimate is greater than, or equal to, the first minimum quality level, said indicator is provided with a signal that does not activate said indicator; and
2) when the signal quality estimate is less than the first minimum quality level, said indicator is provided with a signal that activates said indicator, whereby the user is presented with an indicator warning, with decoded information, and with extrapolated information in response to the received message quality level.

15. In a digital wireless communications system including a plurality of receivers to receive messages of digitally encoded information, a method for a receiver to indicate the signal quality of a received message to the user of the receiver comprising the steps of:

a) decoding the received digital message;
b) following step a), estimating the quality of the received message to derive a signal quality estimate;
c) activating a static warning indicator in response to the signal quality estimate in step b), whereby a transceiver user is warned of a poor communications link;
d) presenting the information decoded in step a) to the user;
e) averaging the estimated signal quality of messages received over a plurality of predetermined first periods of time to create an average signal quality estimate; and
f) activating the indicator in step c) in response to the average signal quality estimated in step e), the static warning indicator activated having a predetermined indicator signal amplitude, a predetermined indicator signal duration, a predetermined indicator signal spectral content, and a predetermined time domain shape, which vary in response to the average signal quality estimated in step e), to present the warning indicator to the user over a predetermined number of predetermined second periods of time, whereby the static noise patterns presented to the user closely simulate the characteristics of an analog receiver.

16. In a wireless communications system including a plurality of receivers to receive messages of digitally encoded information, a system for indicating the signal quality of a received message comprising:

a signal quality estimator including inputs to accept received message quality data, including an input to accept a predetermined second minimum quality level, and an output to provide a signal quality estimate in response to the received quality data;

a warning indicator which is a static noise generator that generates a static warning that warns a transceiver user of a poor communications link, said warning indicator having an input operatively connected to the output of said signal quality estimator to accept the signal quality estimate, and an output, to warn of poor signal quality, said static warning being activated in response to the signal quality estimate;

a receiver having an input to accept wireless messages, and an output to provide digitally encoded messages;

a decoder circuit to decode digital information, having an input operatively connected to said receiver output to accept a digitally encoded message and an input operatively connected to said signal quality estimator output, and an output to provide decoded information; and an adder circuit to combine the decoded information with the static warning, said adder circuit having a first input operatively connected to said static noise generator output to accept the static warning, and a second input operatively connected to said decoder circuit output to accept decoded information, said decoder circuit being responsive to the signal quality estimate to provide decoded information as follows:
1) when the signal quality estimate is greater than, or equal to, the second minimum quality level, decoded information is provided to said adder circuit; and
2) when the signal quality estimate is less than the second minimum quality level, no decoded information is provided to said adder circuit, whereby the user is not presented with decoded information when the received message quality is below a specified standard;

said adder circuit including an output to provide a combination of the decoded information provided by the decoder circuit with the static warning to provide an indication of signal quality, whereby the combination of static with decoded information gives the user an intuitive sense of the received message quality.

17. A system as in claim 16 in which said adder circuit includes an input to accept extrapolated information, in which said signal quality estimator includes an input to accept a predetermined third minimum quality level, and in which the system further comprises:

an extrapolator circuit having an input operatively connected to said signal quality estimator output to accept the signal quality estimate, and an output operatively connected to said adder circuit input to provide extrapolated information, said extrapolator responsive to the signal quality estimate as follows:
1) when the signal quality estimate is greater than, or equal to, the third minimum quality level, no extrapolated information is provided to said adder circuit; and
2) when the signal quality estimate is less than the third minimum quality level, extrapolated information is provided to said adder circuit, whereby the user is presented with extrapolated information in response to the received message quality.

18. A system as in claim 17 in which said signal quality estimator includes an input to accept a predetermined first minimum quality level, and in which said signal quality estimator provides a signal quality estimate output as follows:
1) when the signal quality estimate is greater than, or equal to, the first minimum quality level, said indicator is provided with a signal that does not activate said indicator; and
2) when the signal quality estimate is less than the first minimum quality level, said indicator is provided with a signal that activates said indicator, whereby the user is presented with an indicator warning, with decoded information, and with extrapolated information in response to the received message quality level.

19. In a digital wireless communications system including a plurality of receivers to receive messages of digitally encoded information, the communications system being a GSM cellular phone network with intercommunicating mobile station telephones and a communicating base station, wherein the system utilizes a discontinuous transmission function (DTX) to disable transmission during periods of time when no information is being transmitted, and wherein the base station initiates the DTX function, a method for a receiver to indicate the signal quality of a received message to the user of the receiver comprising the steps of:

a) decoding the received digital message to recover the encoded information;
b) following step a), estimating the quality of the received information to derive a signal quality estimate, the signal quality being estimated in response to the following network-controlled message quality data:
1) received message signal strength, which provides a measurement of carrier power of a received message;
2) block decoder status, which indicates whether received messages are successfully decoded into information;
3) path metric data, which provides a measurement of the corrections required to decode message information, whereby the signal quality is based on carrier power, the amount of lost information, and the amount of corrected information;
4) mobile station transmitter carrier power level, which provides an indication of signal quality as measured by a communicating base station;
5) timing advance, which provides a measurement of how far a mobile station is from a communicating base station; and
6) the status of the DTX function to determine if the DTX function has been initiated, whereby the message quality standards are adjusted in response to the increased sensitivity of the transceiver to message errors when DTX mode is in use;
c) activating an indicator in response to the signal quality estimate in step b), whereby a receiver user is warned of a poor communications link; and
d) presenting the information decoded in step a) to the user.

20. In a digital wireless communications system including a plurality of receivers to receive messages of digitally encoded information, wherein the communications system is a GSM cellular phone network of intercommunicating mobile station telephones and a communicating base station, wherein the system utilizes a discontinuous transmission function (DTX) to disable transmission during periods of time when no information is being transmitted, wherein the base initiates the DTX function, a system for a receiver to indicate the signal quality of received information to a user of the receiver comprising:

a decoder circuit to decode digital information, having an input operatively connected to said receiver output to accept a digitally encoded message, and an output to provide decoded information;

a signal quality estimator including inputs to accept received message quality data which is responsive to errors in decoding the information, and inputs responsive to the following network-controlled message quality data:
received message signal strength, which provides a measurement of the carrier power of a received message;

block decoder status, which indicates whether received messages are successfully decoded into information;

path metric data which provides a measurement of the corrections required to decode message information, whereby the signal quality estimate output is based on carrier power, the amount of lost information, and the amount of corrected information;

mobile station transmission carrier power level, which provides an indication of signal quality as measured by a communicating base station;

timing advance, which provides a measurement of how far a mobile station is from a communicating base station; and the status of the DTX function to determine in the DTX function has been initiated, so that the message quality standards are adjusted in response to the increased sensitivity of the transceiver to message errors when DTX mode is in use;

said signal quality estimator further including an output to provide a signal quality estimate in response to the received quality and the network-controlled message quality data; and an indicator having an input operatively connected to the output of said signal quality estimator to accept the signal quality estimate, and an output, to warn of poor signal quality, which is activated in response to the signal quality estimate, whereby said indicator warns a receiver user of a poor communications link.

* * * * *